US008995429B1

(12) United States Patent
Breau et al.

(10) Patent No.: US 8,995,429 B1
(45) Date of Patent: *Mar. 31, 2015

(54) SOCKET-BASED INTERNET PROTOCOL FOR WIRED NETWORKS

(71) Applicant: Sprint Communications Company L.P., Overland Park, KS (US)

(72) Inventors: Jeremy R. Breau, Leawood, KS (US); John H. Bennett, III, Lawrence, KS (US); Terry D. Nebergall, Gardner, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/693,840

(22) Filed: Dec. 4, 2012

Related U.S. Application Data

(63) Continuation of application No. 12/433,483, filed on Apr. 30, 2009, now Pat. No. 8,335,210, which is a continuation-in-part of application No. 12/400,588, filed on Mar. 9, 2009, now Pat. No. 8,279,853.

(51) Int. Cl.
*H04L 12/66* (2006.01)
*G06F 15/16* (2006.01)
*H04L 29/12* (2006.01)

(52) U.S. Cl.
CPC ................................. *H04L 61/2007* (2013.01)
USPC ........................................... 370/352; 709/203

(58) Field of Classification Search
CPC ....................................................... H04L 12/66
USPC ......... 370/400, 401, 352, 356, 468, 419, 328, 370/329
See application file for complete search history.

(56) References Cited

U.S. PATENT DOCUMENTS

| 7,031,275 B1 * | 4/2006 | Borella et al. ................. 370/328 |
| 7,471,684 B2 * | 12/2008 | Finley et al. .................. 370/392 |
| 8,279,853 B1 * | 10/2012 | Breau et al. ................... 370/352 |
| 8,335,210 B1 * | 12/2012 | Breau et al. ................... 370/352 |

OTHER PUBLICATIONS

Pre-Interview First Office Action mailed Oct. 11, 2013 in U.S. Appl. No. 13/560,480.

* cited by examiner

*Primary Examiner* — Hanh N Nguyen

(57) ABSTRACT

Systems and methods for assigning unique network identifiers in a packet-switched wired network and methods for communicating with a network device in a packet-switched wired network are provided. A request for a unique network identifier for a network device is received. A socket-based unique network identifier, including an IP address and one or more ports, is assigned to the network device. The unique network identifier is created by combining an IP address and one or more ports. This allows multiple unique network identifiers to be created from a single IP address, where each unique network identifier consists of the same IP address combined with a different group of one or more ports.

14 Claims, 3 Drawing Sheets

SOCKET-BASED INTERNET PROTOCOL FOR WIRED NETWORKS

CROSS-REFERENCE TO RELATED APPLICATIONS

This application is a continuation of U.S. patent application Ser. No. 12/433,483, filed Apr. 30, 2009, entitled "Socket-Based Internet Protocol For Wired Networks," which is a continuation-in-part of prior U.S. application Ser. No. 12/400,588, filed Mar. 9, 2009, U.S. Pat. No. 8,279,853, entitled "Socket-Based Internet Protocol For Wireless Networks," each of which is herein incorporated by reference.

BACKGROUND

Communication among computing devices typically occurs through networks. For computing devices in a wired network to communicate, each device must have a unique network identifier. In packet-switched networks, each network device is assigned an internet protocol (IP) address to identify the particular device in the network.

The dominant standard for IP addresses is internet protocol version four (IPv4). IPv4 addresses are 32 bits in length, which limits the possible number of IPv4 addresses available for use to 4,294,967,296 ($2^{32}$). As the number of computing devices seeking network connections continues to grow, the number of available IPv4 addresses continues to decline and will eventually reach zero. This problem is known as IPv4 address exhaustion. Although estimates of the approximate date of IPv4 address exhaustion vary, it is widely recognized that IPv4 addresses will eventually be exhausted.

SUMMARY

Embodiments of the present invention relate to systems and methods for assigning unique network identifiers in a packet-switched wired network. The systems and methods describe assigning a socket-based unique network identifier, including an IP address and one or more ports, to a network device. Creating a unique network identifier by combining an IP address and one or more ports allows the assignment of unique network identifiers to multiple devices in the same network using only one IP address. Because each unique network identifier includes one or more ports in addition to an IP address, the usefulness of one IP address is extended from one network device to multiple network devices.

In one embodiment, computer-readable media are provided having embodied thereon computer-useable instructions that, when executed, perform a method of assigning a socket-based unique network identifier in a packet-switched wired network. The method includes predetermining a number of ports sufficient for network devices in the packet-switched wired network. Unassigned ports of a particular IP address are organized into groupings of the predetermined number of ports. A request for a first unique network identifier for a first network device is received. The first unique network identifier is assigned to the first network device, where the first unique network identifier includes the particular IP address and a first one of the groupings of the predetermined number of ports. A request is received for a second unique network identifier for a second network device. The second unique network identifier is assigned to the second network device, where the second unique network identifier includes the same particular IP address assigned to the first network device and a second one of the groupings of the predetermined number of ports that is not assigned to the first network device.

In another embodiment, computer-readable media are provided having embodied thereon computer-useable instructions that, when executed, perform a method of communicating with a first network device in a packet-switched wired network having a plurality of network devices. The method includes assigning the first network device a first unique network identifier, where the first unique network identifier includes an IP address and one or more ports, where the one or more ports are selected to provide a sufficient number of ports, and where the sufficient number of ports is a number of ports based on requirements of the first network device. A second unique network identifier is assigned to a second network device, where the second unique network identifier includes the same IP address assigned to the first network device and one or more different ports that are not assigned to the first network device. One or more packets intended for the first network device are received. Based on the first unique network identifier assigned to the first network device, the one or more packets are transmitted to the first network device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Figure 1:
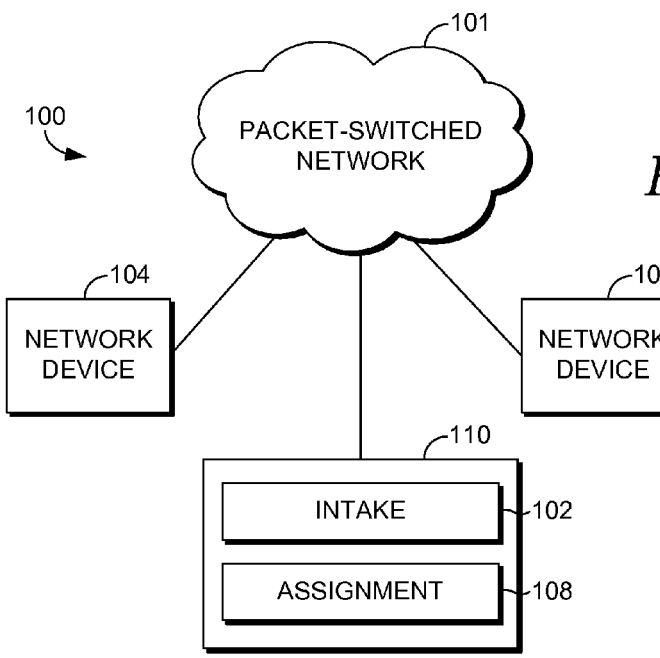
FIG. 1 is a block diagram of a unique network identifier assignment system according to an embodiment of the present invention.

Embodiments of the present invention are described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems and methods for assigning unique network identifiers in a packet-switched wired network. In packet-switched networks, information is divided into packets and routed to a destination. Internet protocol (IP) is the predominant packet-switching protocol, which enables delivery of packets from a source device to a destination device. In order for a data packet to successfully complete the journey from source to destination, each source and destination device must have a unique network identifier. Currently, each network device in a packet-switched wired network is assigned an IP address as a unique network identifier. IP addresses can be assigned manually or through dynamic host configuration protocol (DHCP) or other protocols or methods.

In packet-switched wired networks using DHCP, a DHCP server receives requests for IP addresses and assigns IP addresses. When a DHCP server responds to a client request for an IP address by assigning the client an IP address, a router in the network sees the assignment and stores which IP address is assigned to which physical network device. In networks using address resolution protocol (ARP), the router stores the IP address in association with the network device's media access control (MAC) address. When future packets arrive at the router, the router will perform a lookup by destination IP address to determine to which MAC address the packet should be routed.

As discussed above, the dominant standard for IP addresses is IPv4. Internet protocol version six (IPv6) has been developed as an alternative to IPv4, but IPv6 has not been widely adopted. While IPv6 would provide 128-bit addressing (providing $2^{128}$ possible addresses) and virtually eliminate the concern of IP address exhaustion, implementation of IPv6 requires a significant software and hardware investment and is not a practical solution to IPv4 exhaustion at this time.

When an IP address is assigned to a single network device, thousands of ports are often left unused. Each IP address has 65,536 ($2^{16}$) ports. Some ports are typically assigned specific functions. For example, port 80 is typically assigned to hypertext transfer protocol (HTTP) communication. Ports typically assigned to specific functions and ports actually used by the device to which an IP address is assigned only constitute a small percentage of the available ports, leaving potentially thousands of ports unused. The systems and methods described herein make use of these currently unused ports and allow one IP address to be assigned to potentially thousands of network devices, thus providing an immediate, cost-effective solution to IPv4 exhaustion.

Embodiments of the invention relate to assigning a unique network identifier, including an IP address and one or more ports, to a network device in a packet-switched wired network. The combination of an IP address and a port is known as a socket and can be written as "IP_address:port." For example, the socket consisting of IP address 192.168.1.1 and port 1200 is written "192.168.1.1:1200." A second socket-based unique identifier can then be assigned to a second network device using the same IP address and one or more different ports that were not assigned to the first network device. For example, 192.168.1.1:1200-1299 may be assigned to a first network device, and 192.168.1.1:1300-1399 may be assigned to a second network device. Additional unique network identifiers may be created by combining IP address 192.168.1.1 and other port groupings. These additional unique network identifiers may be assigned to additional network devices.

FIG. 1 illustrates a unique network identifier assignment system 100 for a packet-switched wired network 101. In packet-switched network 101, which could be the Internet, a local area network (LAN), wide area network (WAN), or other packet-switched network, an intake component 102 receives requests to assign a unique network identifier to a network device, such as network device 104 and network device 106. The request could originate from network device 104 or from a router, server, network manager, or other network entity. Network device 104 may be a personal computer, computer workstation, printer, or other device physically connected to packet-switched network 101. In one embodiment, intake component 102 is a server or other computing device with software functionality to receive and forward requests for unique network identifiers. In alternate embodiments, the functionality of intake component 102 is distributed across multiple computing devices. In still other embodiments, intake component 102 is a functional component of a single server or computing device such as a server 110, which may be a DHCP server.

An assignment component 108 identifies an unassigned unique network identifier and assigns the unassigned unique network identifier to the requesting network device, such as network device 104 or network device 106. In one embodiment, assignment component 108 is a server or other computing device with software functionality to identify and assign unique network identifiers. In other embodiments, the functionality of assignment component 108 is distributed across multiple computing devices. In still other embodiments, assignment component 108 and intake component 102 are functional components of a single server or computing device, such as server 110, which may be a DHCP server. Assignment component 108 may also be the network manager.

The unique network identifier identified and assigned by assignment component 108 includes an IP address and one or more of that IP address's 65,536 ports. In one embodiment, the unused ports for a particular IP address are grouped before assignment, such that a list of unique network identifiers is created for one IP address, each identifier including the IP address and one or more ports. In certain embodiments, the unused ports of a particular IP address are organized into groupings of a number of ports predetermined to be generally sufficient for network devices—for example, 100 ports per grouping. The ports contained in each grouping may be continuous or non-continuous. According to these embodiments, when a request for a unique network identifier is received, assignment component 108 selects a unique network identifier from the list.

Embodiments of the invention present assignment component 108 with multiple IP addresses available to assign. In such embodiments, each IP address is divided into multiple unique network identifiers as described above. Assignment component 108 assigns a requesting network device any of the unassigned unique network identifiers. For example, assignment component 108 assigns IP address 1.2.3.4, combined with ports 220-319, to address-requesting network device 104. Assignment component 108 might then assign IP address 1.2.3.4, combined with a different port grouping, such as 320-419, to address-requesting network device 106. Alternatively, assignment component 108 assigns a different IP address, such as 9.8.7.6, combined with a port grouping to address-requesting network device 106. Although FIG. 1 indicates only two network devices for simplicity, any number of network devices is contemplated. No particular order need be followed in assigning unique network identifiers to network devices. That is, all unique network identifiers created from one particular IP address do not need to be assigned before unique network identifiers created from a different IP address are assigned.

Different network devices may require different numbers of total ports. In such embodiments, assignment component 108 evaluates what type of network device is requesting a unique network identifier, or whether the requesting network device has specific functions or requirements, including the device's bandwidth needs, and dynamically groups unused ports to form a unique network identifier with an appropriate number of ports. Alternatively, an IP address's unused ports are grouped into groupings of different sizes before a request for a unique network identifier is received. Depending on the embodiment of the invention, port grouping and creation of unique network identifiers could be performed by assignment component 108 or could be performed external to assignment component 108.

Assignment component 108 assigns a socket-based unique network identifier either automatically or manually. DHCP is the predominant protocol used to automatically assign IP addresses, DNS server addresses, Gateway IPs, and SubNet Masks, although other protocols could be used. As discussed above, in certain embodiments, assignment component 108 is part of a DHCP server. DHCP can be modified to assign a port with an IP address. Packet-switched communication can occur through a variety of transport layer protocols such as transmission control protocol (TCP) or user datagram protocol (UDP). For a network device running the Microsoft® Windows® operating system, a socket-based unique network identifier can be assigned using the commands below. These exemplary commands assign a socket-based unique network identifier created by combining an IP address and ports 34,000-34,999 of that IP address. Commands are presented for both TCP and UDP communication.

netsh int ipv4 set dynamicport tcp start=34000 num=1000 (TCP) or
    netsh int ipv4 set dynamicport udp start=34000 num=1000 (UDP).

For a network device running the Linux operating system, the same unique network identifier may be manually assigned using the following command:

sysctl -w net.ipv4.1p local port range="34000 35000."

Figure 2:
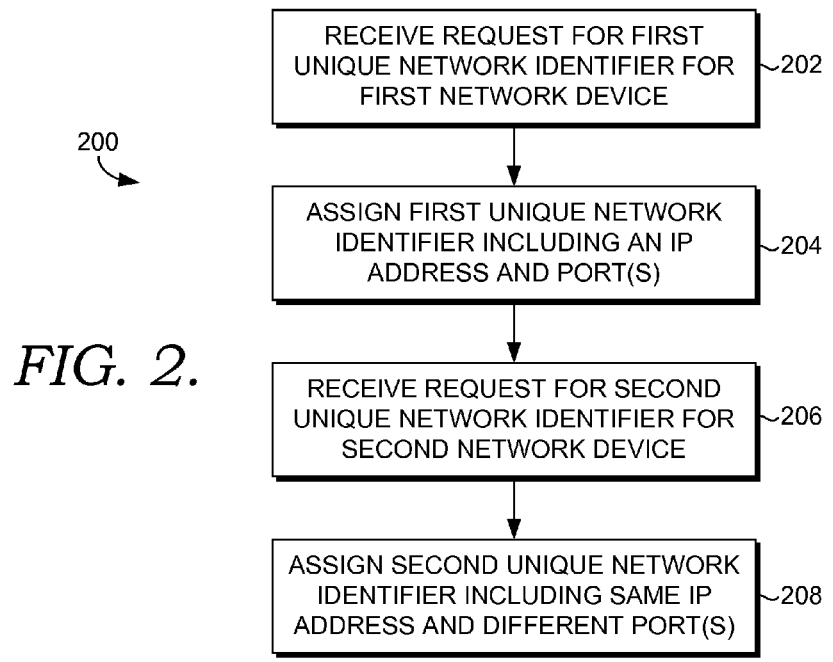
FIG. 2 is a flow chart of an exemplary method for assigning a unique network identifier in a packet-switched wired network.

FIG. 2 illustrates an exemplary method 200 of assigning a socket-based unique network identifier in a packet-switched wired network. A request for a first unique network identifier for a first network device is received in step 202. The request may be received by a router. The request could originate from the first network device or from a server, network manager, or other network entity. A first unique network identifier is assigned in step 204. The first unique network identifier includes an IP address and one or more ports, as discussed in detail above. The first unique network identifier can be assigned as described above. A request for a second unique network identifier for a second network device is received in step 206. The request for the second unique network identifier may also be received by the router. As with step 202, the request could come from the second network device or from a server, network manager, or other network entity. A second unique network identifier is assigned in step 208. The second unique network identifier includes the same IP address as the first unique network identifier and one or more ports that are not part of the first unique network identifier. Thus, method 200 allows two unique network identifiers to be assigned using only one IP address. Additional unique network identifiers created from the same IP address may also be assigned in this fashion.

Although communications may occur consistent with various protocols and standards on a wired, packet-switched network, the TCP/IP suite of protocols is the predominant standard. In TCP/IP implemented networks, a DHCP server typically controls the assignment of IP addresses. When a network device is connected, the device transmits a request for an IP address. The DHCP server receives the request and assigns the network device an IP address. Often, the DHCP server assigns the IP address for a specified time period, known as leasing the IP address to the network device. A router in the network stores the IP address assigned to the network device in association with the MAC address of the network device. This association is typically stored in an ARP table. When packets are sent to the IP address associated with the network device, the router will perform a lookup in the ARP table and route the packets to the network device having the MAC address associated with the destination IP address.

Figure 3:
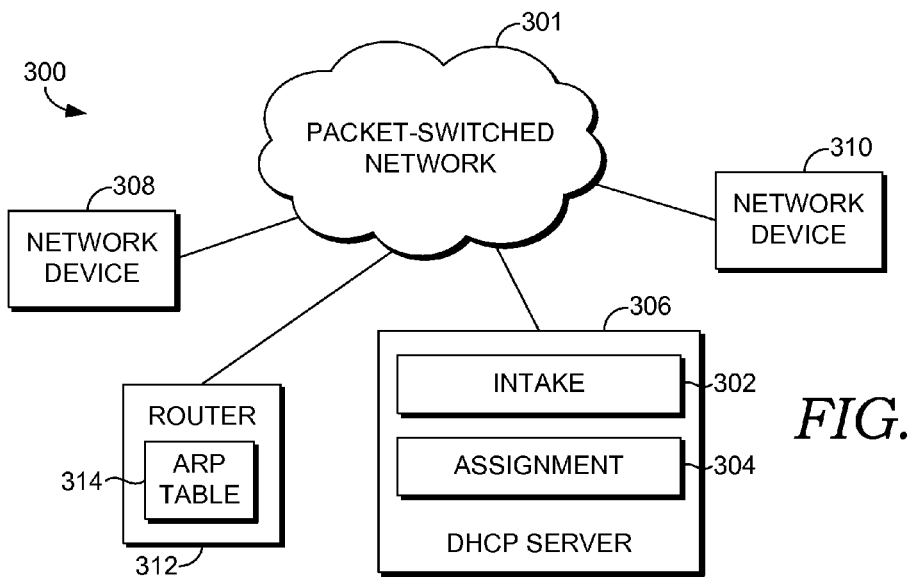
FIG. 3 is a block diagram of a unique network identifier assignment system, according to an embodiment of the present invention, in which a DHCP server assigns unique network identifiers.

FIG. 3 illustrates an embodiment of a unique network identifier assignment system 300 for a packet-switched network 301 that is configured for TCP/IP. In packet-switched network 301, which could be the Internet, a local area network (LAN), wide area network (WAN), or other packet-switched network, an intake component 302 and an assignment component 304 are part of a DHCP server 306. Intake component 302 receives a request to assign a unique network identifier to a network device, such as network device 308 and network device 310. The request could originate from network device 308 or from a server, network manager, or other network entity. Network device 308 may be a personal computer, computer workstation, printer, or other device physically connected to packet-switched network 301. In some embodiments, intake component 302 is a server or other computing device with software functionality to receive and forward requests for unique network identifiers. In other embodiments, the functionality of intake component 302 is distributed across multiple computing devices.

Assignment component 304 of DHCP server 306 identifies an unassigned unique network identifier and assigns the unassigned unique network identifier to the requesting network device, such as network device 308 or network device 310. In certain embodiments, assignment component 304 is a server or other computing device with software functionality to identify and assign unique network identifiers. The functionality of assignment component 304 is distributed across multiple computing devices in other embodiments.

The unique network identifier identified and assigned by assignment component 304 of DHCP server 306 includes an IP address and one or more of that IP address's 65,536 ports. In one embodiment, the total number of unused ports for a particular IP address is divided into groups before assignment, such that a list of unique network identifiers is created for one IP address, with each identifier including the IP address and one or more ports. The groups into which the unused ports of a particular IP address are divided may be a number of ports predetermined to be generally sufficient for network devices—for example, 100 ports per grouping. The ports contained in each grouping may be continuous or non-continuous. When a request for a unique network identifier is received, assignment component 304 of DHCP server 306 then selects an identifier from the list.

In embodiments of the invention, assignment component 304 of DHCP server 306 has multiple IP addresses available to assign. In such embodiments, each IP address is divided into multiple unique network identifiers as described above. Assignment component 304 assigns a requesting network device any of the unassigned unique network identifiers. For example, assignment component 304 could assign IP address 1.2.3.4, combined with ports 220-319, to address-requesting network device 308. Assignment component 304 could then assign IP address 1.2.3.4, combined with a different port grouping, such as 320-419, to address-requesting network device 310. Alternatively, assignment component 304 could assign IP address 9.8.7.6 combined with a port grouping to address-requesting network device 310. Assignment component 304 of DHCP server 306 assigns socket-based unique network identifiers using DHCP. When a unique network identifier is assigned, the unique network identifier and the MAC address of the network device to which it is assigned are captured by a router 312 and stored in an ARP table 314.

Different network devices may require different numbers of total ports. In certain embodiments, assignment component 304 of DHCP server 306 evaluates what type of network device is requesting a unique network identifier, or whether the requesting network device has specific functions or requirements, including the device's bandwidth needs, and dynamically groups unused ports to form a unique network identifier with an appropriate number of ports. Alternatively, an IP address's unused ports may be grouped into groupings of different sizes before a request for a unique network identifier is received. Depending on the embodiment of the invention, port grouping and creation of unique network identifiers may be performed by assignment component 304 or may be performed external to assignment component 304.

Figure 4:
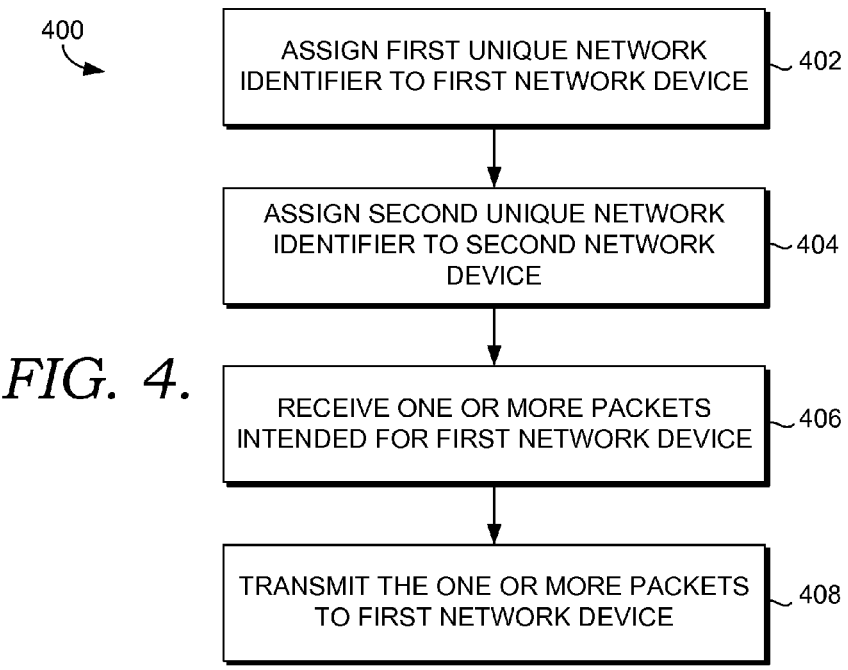
FIG. 4 is a flow chart of an exemplary method for communicating with a network device in a packet-switched wired network.

FIG. 4 illustrates an exemplary method 400 of communicating with a first network device in a packet-switched wired network having a plurality of network devices. In step 402, a first network device is assigned a first unique network identifier including an IP address and one or more ports. In step 404, a second network device is assigned a second unique network identifier. The second unique network identifier includes the same IP address assigned to the first network device and one or more different ports that are not assigned to the first network device, as described above. DHCP has been modified to allow assignment of one or more ports along with the IP address.

The first unique network identifier, as well as the MAC address of the network device to which it is assigned, and the second unique network identifier, as well as the MAC address of the network device to which it is assigned, are recorded by a router in the network and used to populate the router's ARP table. ARP has been modified to allow recordation of both an IP address and one or more ports. One or more packets intended for the first network device are received in step 406. The receiving entity could be a router, server, network manager, or other computing device. Based on the unique network identifier, the one or more packets are transmitted to the first wireless device in step 408.

Figure 5:
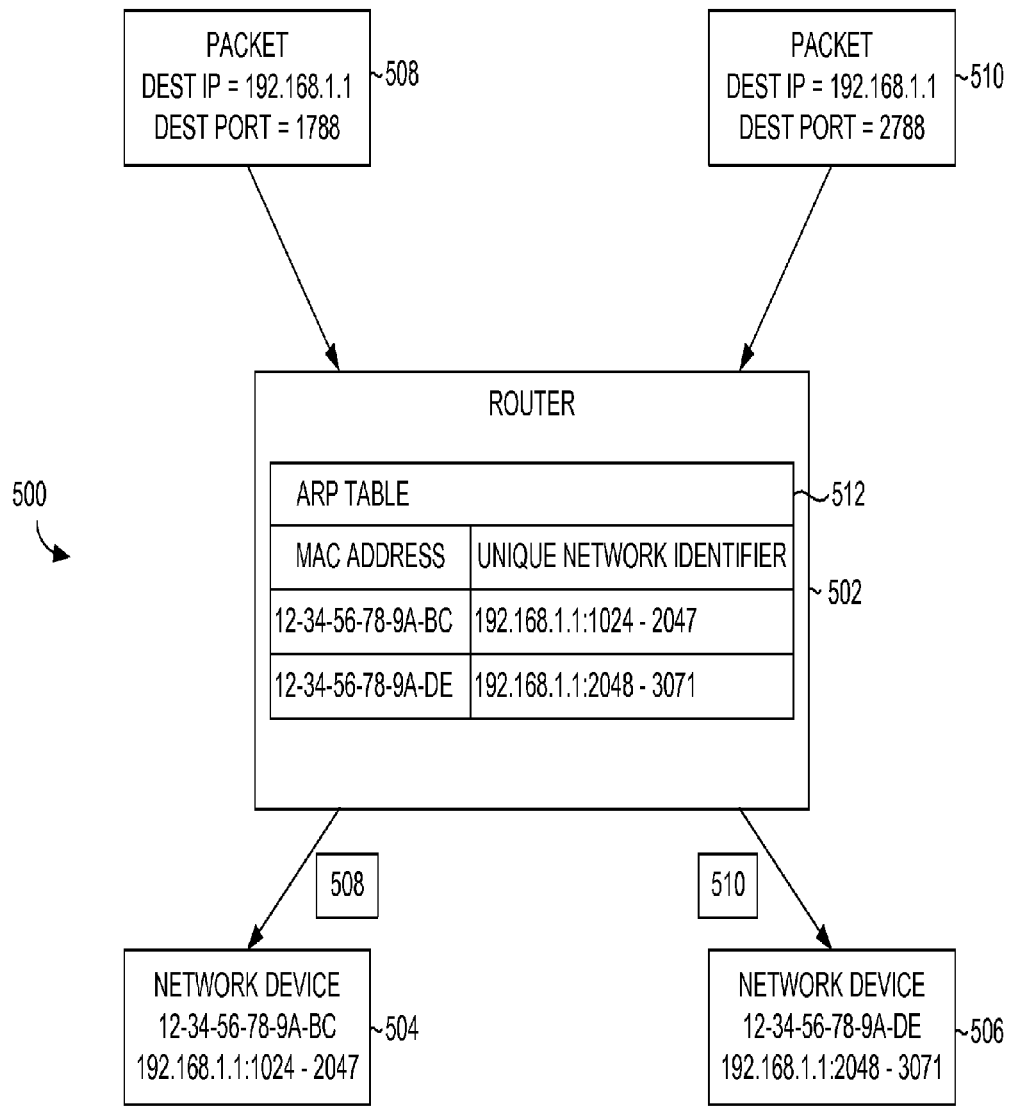
FIG. 5 is a block diagram of a network device communication system according to an embodiment of the present invention.

FIG. 5 further illustrates method 400 of communicating with a network device discussed with reference to FIG. 4 in a TCP/IP configured packet-switched wired network. A TCP/IP-configured communication system 500 includes a router 502, a network device 504, and a network device 506. When network devices request access to the network, each device is identified by that device's MAC address. Each device's MAC address may be a universally administered address determined by the device manufacturer or a locally administered address assigned by the network administrator. MAC addresses are 48-bits in length and can be represented in hexadecimal format as XX-XX-XX-XX-XX-XX, where X is one of 0-9 and A-F. Network device 504 is identified by 12-34-56-78-9A-BC, and network device 506 is identified by 12-34-56-78-9A-DE. Network device 504 is assigned IP address 192.168.1.1 and port range 1024-2047. Network device 506 is also assigned IP address 192.168.1.1 but is assigned a different port range—2048-3071. For each network device, the assigned unique network identifier and MAC address pair are recorded in ARP table 512 of router 502.

A packet 508 and a packet 510 are received by router 502. Packet 508 has a destination IP address of 192.168.1.1 and a destination port of 1788. Packet 510 has a destination IP address of 192.168.1.1 and a destination port of 2788. When packet 508 arrives at router 502, router 502 compares the destination IP address and destination port of packet 508, which is 192.168.1.1:1788, to the ARP table entries. After accessing the ARP table, router 502 determines that network devices with the MAC addresses 12-34-56-78-9A-BC and 12-34-56-78-9A-DE are associated with IP address 192.168.1.1. The router then locates the MAC address of the device whose unique network identifier port range includes the destination port 1788. Network device 504 (MAC address 12-34-56-78-9A-BC) has been assigned port range 1024-2047, so packet 510 is routed to network device 504.

Similarly, packet 510 is received by router 502. Router 502 compares the destination IP address and destination port of packet 510, which is 192.168.1.1:2788, to the ARP table entries. After accessing the ARP table, router 502 determines that network devices with the MAC addresses 12-34-56-78-9A-BC and 12-34-56-78-9A-DE are associated with IP address 192.168.1.1. The router then locates the MAC address of the device whose unique network identifier port range includes the destination port 2788. Network device 506 (MAC address 12-34-56-78-9A-DE) has been assigned port range 2048-3071, so packet 508 is routed to network device 506.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more nontransitory computer-readable media having embodied thereon computer-programming instructions that, when executed, perform a method of assigning a socket-based unique network identifier in a packet-switched wired network, the method comprising:
   predetermining a number of ports sufficient for network devices in the packet-switched wired network;
   organizing unassigned ports of a particular IP address into groupings of the predetermined number of ports;
   receiving a request for a first unique network identifier for a first network device;
   assigning the first unique network identifier to the first network device, wherein the first unique network identifier includes the particular IP address and a first one of the groupings of the predetermined number of ports;
   receiving a request for a second unique network identifier for a second network device; and
   assigning the second unique network identifier to the second network device, wherein the second unique network identifier includes the same particular IP address assigned to the first network device and a second one of the groupings of the predetermined number of ports that is not assigned to the first network device.

2. The media of claim 1, wherein the IP address is an IPv4 address.

3. The media of claim 1, wherein the organizing of the unassigned ports of the particular IP address into groupings of the predetermined number of ports occurs prior to the first assigning step.

4. The media of claim 1, wherein the first and second unique network identifiers are assigned to the first and second network devices for a predetermined time period.

5. The media of claim 1, wherein the first receiving step, the first assigning step, the second receiving step, and the second assigning step are performed by a DHCP server.

6. The media of claim 5, wherein DHCP is modified to assign one or more ports along with an IP address.

7. The media of claim 1, wherein the first and second network devices each have a unique device identifier, and wherein a router associates the unique device identifier and unique network identifier of each network device.

8. The media of claim 7, wherein the unique device identifier is a MAC address, wherein the router has an ARP table, and wherein the ARP table is populated with the unique network identifier and MAC address of each network device.

9. One or more nontransitory computer-readable media having embodied thereon computer-programming instructions that, when executed, perform a method of communicating with a first network device in a packet-switched wired network having a plurality of network devices, the method comprising:
   assigning the first network device a first unique network identifier, wherein the first unique network identifier includes an IP address and one or more ports, wherein the one or more ports are selected to provide a sufficient number of ports, wherein the sufficient number of ports is a number of ports based on requirements of the first network device;
   assigning a second unique network identifier to a second network device, wherein the second unique network identifier includes the same IP address assigned to the first network device and one or more different ports that are not assigned to the first network device;
   receiving one or more packets intended for the first network device; and
   transmitting, based on the first unique network identifier assigned to the first network device, the one or more packets to the first network device.

10. The media of claim 9, wherein the IP address is an IPv4 address.

11. The media of claim 9, wherein the first and second unique network identifiers are assigned to the first and second network devices for a predetermined time period.

12. The media of claim 9, wherein prior to the first assigning step, unassigned ports of the IP address are grouped into at least two groups such that the first unique network identifier is created by combining the IP address and one or more ports from a first port group and the second unique network identifier is created by combining the IP address and one or more ports from a different port group.

13. The media of claim 9, wherein the receiving step and the transmitting step are performed by a router, wherein the router has previously associated a unique device identifier for each network device with the unique network identifier of each network device.

14. The media of claim 13, wherein the unique device identifier of each network device is a MAC address, wherein the router has an ARP table, and wherein the router has previously populated the ARP table with the unique network identifier and MAC address of each network device.

* * * * *